(12) United States Patent
Liu et al.

(10) Patent No.: US 11,753,031 B2
(45) Date of Patent: Sep. 12, 2023

(54) AUTONOMOUS DRIVING CONTROL SYSTEMS AND METHODS

(71) Applicant: GM GLOBAL TECHNOLOGY OPERATIONS LLC, Detroit, MI (US)

(72) Inventors: Ke Liu, Ypsilanti, MI (US); Omer Tsimhoni, Bloomfield Hills, MI (US); Yi G. Glaser, West Bloomfield, MI (US); Roy J. Mathieu, Rochester Hills, MI (US); Lisa M. Talarico, Milford, MI (US); Robert McCulloch, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 174 days.

(21) Appl. No.: 17/118,966

(22) Filed: Dec. 11, 2020

(65) Prior Publication Data
US 2022/0185314 A1    Jun. 16, 2022

(51) Int. Cl.
| | |
|---|---|
| B60W 60/00 | (2020.01) |
| B60W 10/20 | (2006.01) |
| B60W 10/18 | (2012.01) |
| B60W 10/06 | (2006.01) |
| B60W 10/08 | (2006.01) |
| B60W 30/18 | (2012.01) |
| B60W 30/045 | (2012.01) |
| B60W 30/12 | (2020.01) |
| B60W 30/14 | (2006.01) |
| B60W 40/09 | (2012.01) |

(52) U.S. Cl.
CPC .......... *B60W 60/001* (2020.02); *B60W 10/06* (2013.01); *B60W 10/08* (2013.01); *B60W 10/18* (2013.01); *B60W 10/20* (2013.01); *B60W 30/045* (2013.01); *B60W 30/12* (2013.01); *B60W 30/143* (2013.01); *B60W 30/18159* (2020.02); *B60W 40/09* (2013.01); *B60W 60/0051* (2020.02); *B60W 60/0053* (2020.02); *B60W 2540/18* (2013.01); *B60W 2540/229* (2020.02)

(58) Field of Classification Search
CPC ...... B60W 10/06; B60W 10/08; B60W 10/18; B60W 10/20; B60W 2540/18; B60W 2540/229; B60W 30/045; B60W 30/12; B60W 30/143; B60W 30/18159; B60W 40/09; B60W 60/001; B60W 60/0051; B60W 60/0053
See application file for complete search history.

(56) References Cited

U.S. PATENT DOCUMENTS

| | | | | |
|---|---|---|---|---|
| 2014/0156134 A1* | 6/2014 | Cullinane | ............ | G05D 1/0061 701/23 |
| 2017/0364070 A1* | 12/2017 | Oba | ...................... | G05D 1/0061 |
| 2019/0317506 A1* | 10/2019 | Ishioka | ................. | B60W 10/04 |

(Continued)

*Primary Examiner* — Nadeem Odeh

(57) ABSTRACT

An autonomous driving system of a vehicle includes: an autonomous module configured to, during autonomous driving, control at least one of: steering of the vehicle; braking of the vehicle; and acceleration and deceleration of the vehicle; and a driving control module configured to: enable and disable autonomous driving; determine a future time for beginning a period of autonomous driving; and at least one of: selectively delay the beginning of autonomous driving to after the future time; and cancel the period of autonomous driving.

19 Claims, 7 Drawing Sheets

(56) References Cited

U.S. PATENT DOCUMENTS

2019/0337530 A1\* 11/2019 Hiramatsu ........... G05D 1/0088
2019/0354114 A1\* 11/2019 Goldman ............. G05D 1/0297
2020/0269920 A1\*  8/2020 Millsap ............. B62D 15/0205
2021/0394800 A1\* 12/2021 Kwak ................. B60W 60/001

\* cited by examiner

AUTONOMOUS DRIVING CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to systems and methods for entering and preventing entry into autonomous vehicle operation.

Vehicles include one or more torque producing devices, such as an internal combustion engine and/or an electric motor. A passenger of a vehicle rides within a passenger cabin (or passenger compartment) of the vehicle.

Autonomous driving systems drive a vehicle completely independent of a human driver. For example, autonomous driving systems control the acceleration, brake, and steering systems of a vehicle independent of a driver.

Semiautonomous driving systems drive a vehicle partially independent of a human driver. For example, a semiautonomous driving system may control the steering system independent of a driver while relying on the driver to set a target speed for the semiautonomous driving system to achieve by controlling the acceleration and brake systems.

SUMMARY

In a feature, an autonomous driving system of a vehicle includes: an autonomous module configured to, during autonomous driving, control at least one of: steering of the vehicle; braking of the vehicle; and acceleration and deceleration of the vehicle; and a driving control module configured to: enable and disable autonomous driving; determine a future time for beginning a period of autonomous driving; and at least one of: selectively delay the beginning of autonomous driving to after the future time; and cancel the period of autonomous driving.

In further features, the driving control module is configured to: determine a second future time after the future time when an event may occur and end the period of autonomous driving; and cancel the period of autonomous driving when a period between (a) the future time and (b) the second future time is less than a predetermined period.

In further features, the driving control module is configured to: determine a probability of the event occurring at the second future time; and cancel the period of autonomous driving when both: the period between (a) the future time and (b) the second future time is less than the predetermined period; and the probability of the event occurring is greater than a predetermined value.

In further features, the driving control module is configured to enable autonomous driving at the future time when at least one of: the period between (a) the future time and (b) the second future time is greater than the predetermined period; and the probability of the event occurring is less than the predetermined value.

In further features, the driving control module is configured to selectively adjust one or more of parameters of the autonomous driving based on driver input during autonomous driving.

In further features, the driving control module is configured to adjust a lane positioning during autonomous driving based on driver actuation of a steering wheel during autonomous driving.

In further features, the driving control module is configured to adjust turning at intersections during autonomous driving based on driver turning during autonomous driving.

In further features, the driving control module is configured to: determine a situational awareness value for a driver based on input from a driver monitoring system; and based on the situational awareness value, at least one of: selectively delay the beginning of autonomous driving to after the future time; and cancel the period of autonomous driving.

In further features, the driving control module is configured to, when the situational awareness value is less than a predetermined value, at least one of: selectively delay the beginning of autonomous driving to after the future time; and cancel the period of autonomous driving.

In further features, the driving control module is configured to: determine whether a present speed of the vehicle should be adjusted before beginning the autonomous driving; and when the present speed should be adjusted, at least one of: selectively delay the beginning of autonomous driving to after the future time; and cancel the period of autonomous driving.

In further features, the driving control module is further configured to selectively advance the beginning of autonomous driving to before the future time.

In further features, the driving control module is configured to: determine a second future time after the future time when an event may occur and end the period of autonomous driving; and advance the beginning of autonomous driving such that a period of autonomous driving between the future time and the second future time is at least a predetermined period.

In a feature, an autonomous driving method for a vehicle includes: during autonomous driving, controlling at least one of: steering of the vehicle; braking of the vehicle; and acceleration and deceleration of the vehicle; selectively enabling and disabling autonomous driving; determining a future time for beginning a period of autonomous driving; and at least one of: selectively delaying the beginning of autonomous driving to after the future time; and cancelling the period of autonomous driving.

In further features, the autonomous driving method further includes: determining a second future time after the future time when an event may occur and end the period of autonomous driving; and cancelling the period of autonomous driving when a period between (a) the future time and (b) the second future time is less than a predetermined period.

In further features, the autonomous driving method further includes: determining a probability of the event occurring at the second future time; and cancelling the period of autonomous driving when both: the period between (a) the future time and (b) the second future time is less than the predetermined period; and the probability of the event occurring is greater than a predetermined value.

In further features, the autonomous driving method further includes enabling autonomous driving at the future time when at least one of: the period between (a) the future time and (b) the second future time is greater than the predetermined period; and the probability of the event occurring is less than the predetermined value.

In further features, the autonomous driving method further includes selectively adjusting one or more of parameters of the autonomous driving based on driver input during autonomous driving.

In further features, In further features, the autonomous driving method further includes adjusting a lane positioning during autonomous driving based on driver actuation of a steering wheel during autonomous driving.

In further features, the autonomous driving method further includes adjusting turning at intersections during autonomous driving based on driver turning during autonomous driving.

In further features, the autonomous driving method further includes selectively advancing the beginning of autonomous driving to before the future time.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include one or more cameras and/or one or more sensors used for autonomous driving. A control module may determine whether to perform or disable autonomous driving. The control module may make the determination to maximize the use of autonomous driving and to minimize the use of non-autonomous driving.

Frequent enabling and disabling use of autonomous driving, however, may decrease user trust of the autonomous driving. Additionally, the driver may take one or more actions during autonomous driving to indicate the driver's desires, intent, etc.

The present application involves the control module monitoring the environment, driver intent and situation awareness, historical data, and information from other vehicles and/or infrastructure, to determine whether to automatically enable, disable, or reschedule planned autonomous driving. For example, the control module may delay or disable performance of an autonomous driving event when a period of the autonomous driving would be short, such as when a probability of an event occurring which would cause the autonomous driving to end is greater than a predetermined value. The control module may avoid delay or disable performance of an autonomous driving event when the situational awareness of the driver is low and/or when the vehicle speed should change before autonomous driving begins.

The control module also selectively adjusts a scope of autonomous driving based on driver actions during autonomous driving. For example, when the driver historically turns the vehicle at intersections, the control module may adjust the scope of autonomous driving such that the driver can more freely turn the vehicle at intersections and/or adjust the scope of autonomous driving to turn similarly to turns accomplished by the driver. As another example, when the driver moves the left/right position of the vehicle within its lane from a vehicle in another lane, the control module may adjust the scope of autonomous driving to the left/right lane positioning created by the driver. The control module may adjust the scope of autonomous driving for other situations as well, such as to proceed through yellow traffic signals if the driver historically proceeds through yellow traffic signals, turn right traffic signals on red if the driver historically turns right on red traffic signals, etc.

Figure 1:
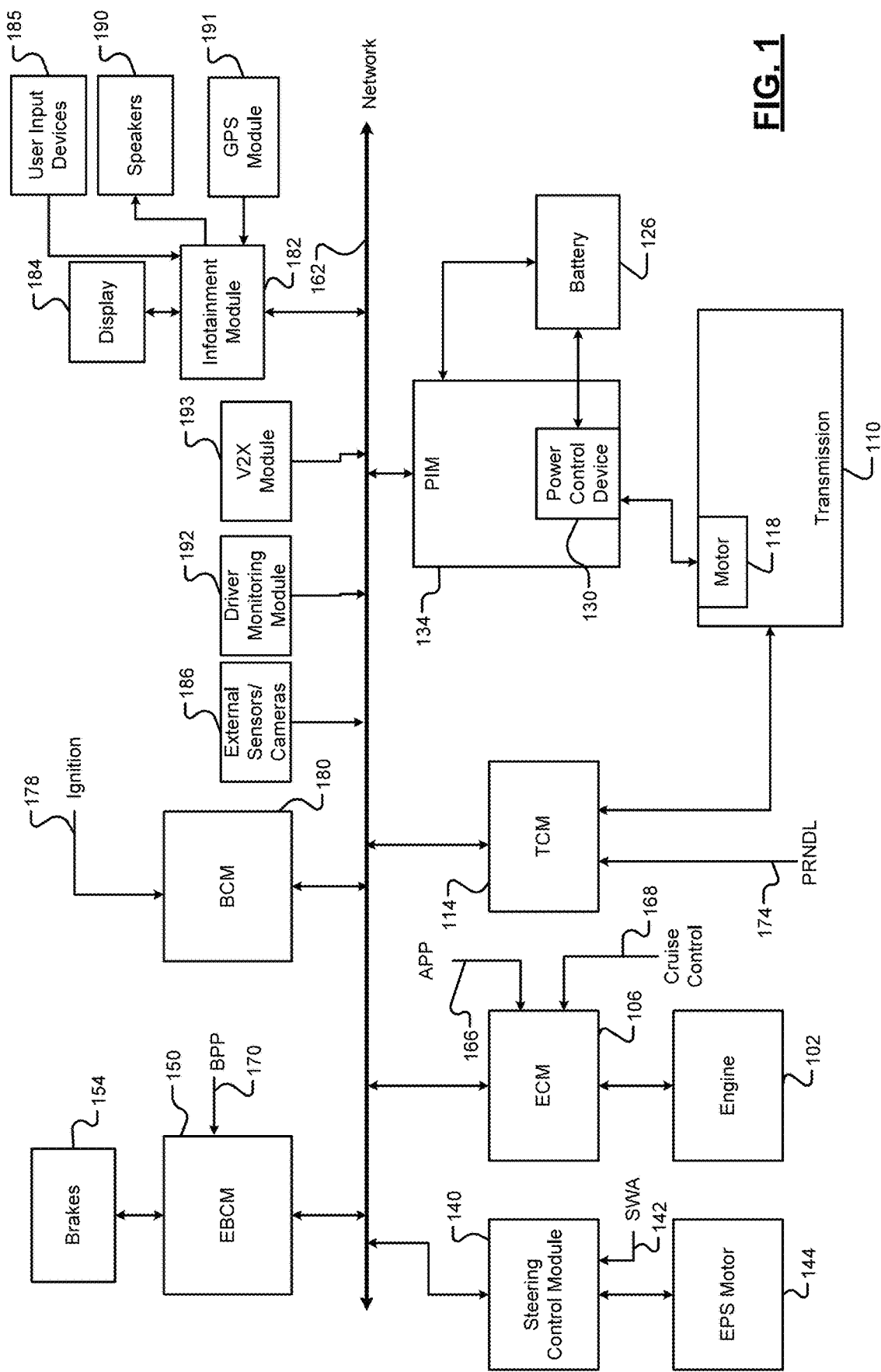
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as an inverter module in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system.

An electronic brake control module (EBCM) 150 may selectively control brakes 154 of the vehicle. Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A cruise control input 168 may also be input to the ECM 106 from a cruise control system. In various implementations, the cruise control system may include an adaptive cruise control system. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system may include an infotainment module 182. The infotainment module 182 controls what is displayed on a display 184. The display 184 may be a touchscreen display in various implementations and transmit signals indicative of user input to the display 184 to the infotainment module 182. The infotainment module 182 may additionally or alternatively receive signals indicative of user input from one or more other user input devices 185, such as one or more switches, buttons, knobs, etc.

The infotainment module 182 may receive input from a plurality of external sensors and cameras, generally illustrated in FIG. 1 by 186. For example, the infotainment module 182 may display video, various views, and/or alerts on the display 184 via input from the external sensors and cameras 186.

The infotainment module 182 may also generate output via one or more other devices. For example, the infotainment module 182 may output sound via one or more speakers 190 of the vehicle. The vehicle may include one or more additional control modules that are not shown, such as a chassis control module, a battery pack control module, etc. The vehicle may omit one or more of the control modules shown and discussed.

Input from the external sensors and cameras 186 may also be used to control autonomous driving, determining whether to enter into or disable autonomous driving, and/or for one or more other uses.

A global positioning system (GPS) module 191 receives GPS data from a GPS system. A driver monitoring module 192 includes one or more devices configured to monitor one or more characteristics of a driver of the vehicle. For example, the driver monitoring module 192 may include one or more cameras configured to capture images of the driver and within a passenger cabin of the vehicle, for example, to determine a facial expression, one or more gestures, hand placement, and other driver information based on the images.

A V2X module 193 communicates with other vehicles via a vehicle to vehicle (V2V) communication protocol and/or with infrastructure via a vehicle to infrastructure (V2I) communication protocol. V2V communication and V2I communication can be more generally referred to as V2X communication.

Figure 2:
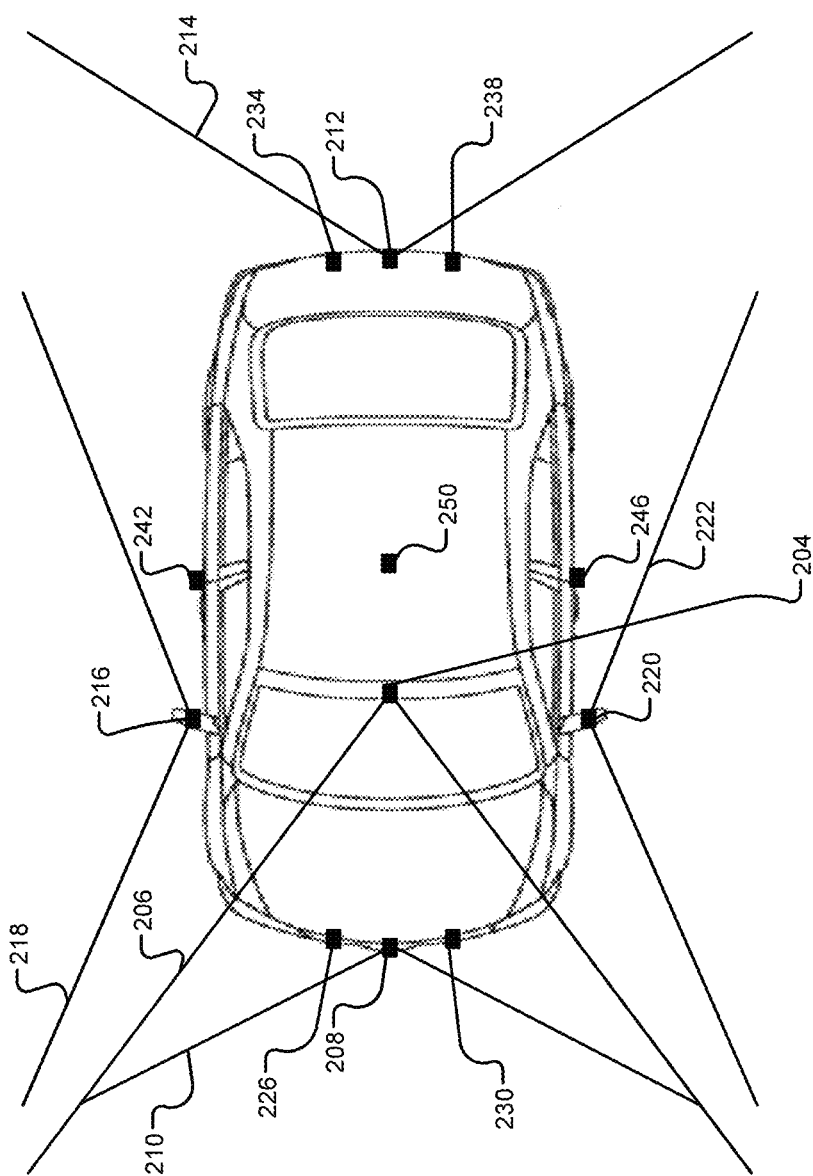
FIG. 2 is a functional block diagram of a vehicle including examples of external sensors and cameras.

Referring now to FIG. 2, a functional block diagram of a vehicle including examples of external sensors and cameras is presented. The external sensors and cameras 186 include various cameras positioned to capture images and video outside of (external to) the vehicle and various types of sensors measuring parameters outside of (external to) the vehicle. For example, a forward facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward facing camera 204 may be located more rearward, such as with a rear view mirror within a windshield of the vehicle. The forward facing camera 204 may not be able to capture images and video of items within all of or at least a portion of the predetermined FOV of the front camera 208 and may capture images and video that is greater than the predetermined distance of the front of the vehicle. In various implementations, only one of the forward facing camera 204 and the front camera 208 may be included.

A rear camera 212 captures images and video within a predetermined FOV 214 behind the vehicle. The rear camera 212 may capture images and video within a predetermined distance behind vehicle and may be located at the rear of the vehicle, such as near a rear license plate. A right camera 216 captures images and video within a predetermined FOV 218 to the right of the vehicle. The right camera 216 may capture images and video within a predetermined distance to the right of the vehicle and may be located, for example, under a right side rear view mirror. In various implementations, the right side rear view mirror may be omitted, and the right camera 216 may be located near where the right side rear view mirror would normally be located. A left camera 220 captures images and video within a predetermined FOV 222 to the left of the vehicle. The left camera 220 may capture images and video within a predetermined distance to the left of the vehicle and may be located, for example, under a left side rear view mirror. In various implementations, the left side rear view mirror may be omitted, and the left camera 220 may be located near where the left side rear view mirror would normally be located. While the example FOVs are shown for illustrative purposes, the FOVs may overlap, for example, for more accurate and/or inclusive stitching.

The external sensors and cameras 186 also include various other types of sensors, such as radar sensors, a light detection and ranging (LIDAR) sensor 250, etc. For example, the vehicle may include one or more forward facing radar sensors, such as forward facing radar sensors 226 and 230, one or more rearward facing radar sensors, such as rearward facing radar sensors 234 and 238. The vehicle may also include one or more right side radar sensors, such as right side radar sensor 242, and one or more left side radar sensors, such as left side radar sensor 246. The locations and fields of view of the cameras and radar sensors are provided as examples only and different locations and fields of view could be used. Radar sensors output radar signals around the vehicle. Objects around the vehicle can be detected based on input from the external sensors and cameras 186.

Figure 3:
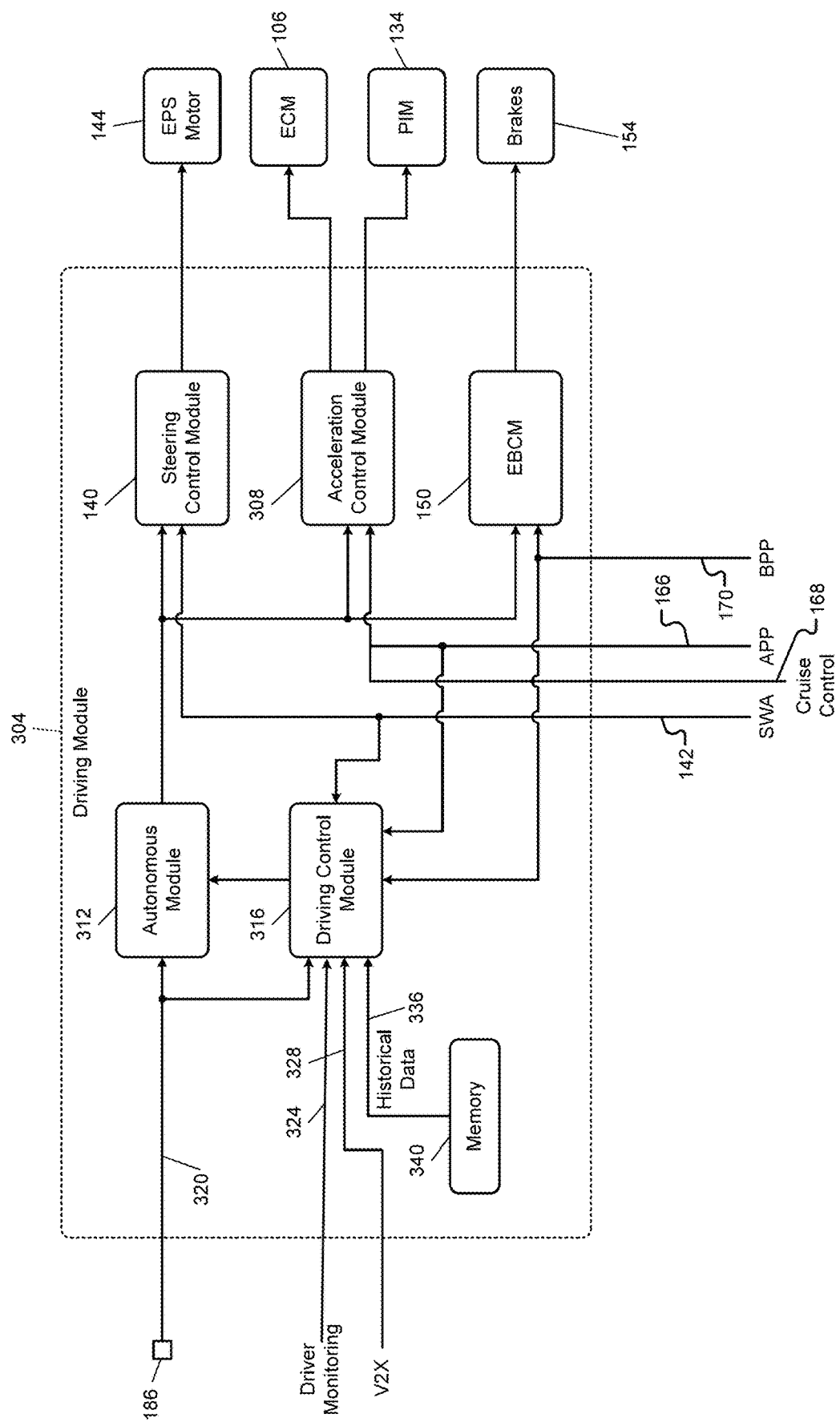
FIG. 3 is a functional block diagram of an example implementation of a driving module.

FIG. 3 includes a functional block diagram of an example implementation of a driving module 304. When autonomous driving is not being performed, as discussed above, the steering control module 140 controls steering of the vehicle based on the SWA 142, and the EBCM 150 controls braking based on the BPP 170. Additionally, an acceleration control module 308 controls acceleration and deceleration of the vehicle based on the APP 166 and/or one or more other inputs. For example, the acceleration control module 308 may control acceleration and deceleration of the vehicle further based on the cruise control input 168, such as to adjust a vehicle speed toward or to a target speed. The target speed may be adjusted, for example, based on the cruise control input 168. The acceleration control module 308 may control acceleration and deceleration via at least one of the ECM 106 (controlling torque of the engine 102) and the TCM 114 (controlling torque of the electric motor 118).

An autonomous module 312 controls steering, acceleration and deceleration, and braking of the vehicle during autonomous driving of the vehicle. For example, the autonomous module 312 may detect features and objects around the vehicle based on input from the external cameras and sensors 186 and control steering, acceleration, and deceleration based on the features and objects, such as to avoid any objects detected. During autonomous driving, however, the steering control module 140 may override input from the autonomous module 312 and control steering based on the SWA 142. Additionally, the acceleration control module 308 may override input from the autonomous module 312 and control acceleration and deceleration based on the APP 166, and the EBCM 150 may override input from the autonomous module 312 and control braking based on the BPP 170. Driver inputs (e.g., the SWA 142, the APP 166, and the BPP 170) during autonomous driving may be used to determine driver intent, as discussed further below.

A driving control module 316 controls whether autonomous driving is performed and, if autonomous driving is performed, a scope of the autonomous driving. The driving control module 316 may control whether autonomous driving is performed and, if autonomous driving is performed, for example, based on input 320 from the external cameras and sensors 186, input 324 from the driver monitoring module 192, V2X data 328 from the V2X module 193, and historical data 336 from previous autonomous driving stored in memory 340. Autonomous driving as used herein may refer to lateral autonomous driving, longitudinal autonomous driving, both lateral and longitudinal autonomous driving, and one or more other aspects of autonomous driving.

Based on the input 320 from the external cameras and sensors 186 at a given time, the driving control module 316 may selectively determine one or more future times for beginning autonomous driving. In this sense, the driving control module 316 may include a planner that determines the future times. The driving control module 316 may selectively determine the one or more future times based on one or more other inputs. For example, the driving control module 316 may determine to begin autonomous driving at a future time X when no objects will impede autonomous driving until after time X. This includes transitions from manual driving to autonomous driving and situations where the driver has overridden one or more aspects of autonomous driving but autonomous driving is still being performed.

The driving control module 316 also predicts times of events that will end autonomous driving based on the input 320. One or more other inputs may also be used. The driving control module 316 also determines probabilities of those events occurring based on the input 320. The probabilities may be values (e.g., 0-100, where increasing value indicates increasing likelihood of occurrence) or levels (e.g., low, medium, high, etc.).

The driving control module 316 selectively postpones, reschedules, advances, or eliminates a future time for beginning autonomous driving. For example, the driving control module 316 may postpone, reschedule, advance, or eliminate a future time for beginning autonomous driving when a period between the future time for beginning autonomous driving and a next predicted time that will end autonomous driving is less than a predetermined period and the probability of the event occurring is high or greater than a predetermined value. This may prevent short instances of autonomous driving that may decrease driver confidence in the autonomous driving. The driving control module 316 may honor a future time for beginning autonomous driving when at least one of (a) the period is greater than the predetermined period and (b) the probability is low or less than a predetermined value. The driving control module 316 may advance (move closer in time) a future time for beginning autonomous driving, for example, when a predicted period of autonomous driving would be small. For example, a first event that has a low probability of causing an ending autonomous driving followed by a second event that has a high probability of causing an ending of autonomous driving and a period between a future time for beginning autonomous driving (before the first event) is less than a predetermined period, the driving control module 316 may advance the future time to lengthen the period of autonomous driving. The driving control module 316 may, for example, advance the future time such that the period between the future time and the second event is greater than or equal to the predetermined period. The driving control module 316 may postpone, reschedule, eliminate, or adjust the scope of autonomous driving in one or more other situations, such as discussed further below.

Figure 4:
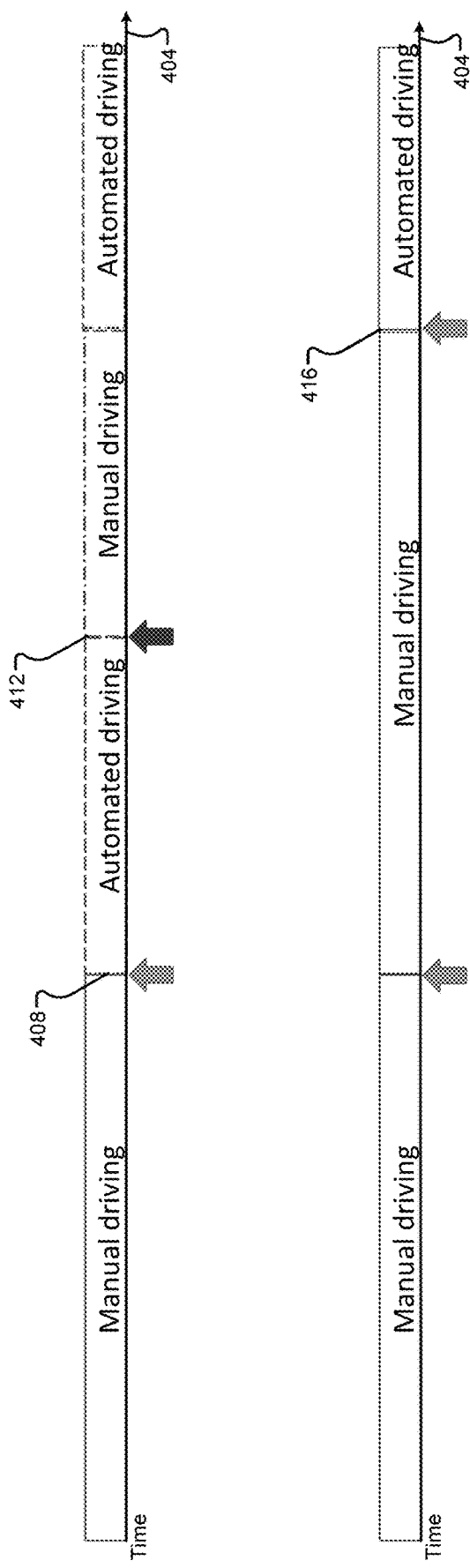
FIG. 4 includes example graphs of autonomous and non-autonomous (e.g., manual) driving over time.

FIG. 4 includes example graphs of autonomous and non-autonomous (manual) driving over time 404. The top graph illustrates determining to start autonomous driving at future time 408. The autonomous driving would be predicted to end at time 412.

Because the period between times 408 and 412 is relatively short and the probability of the event at 408 occurring is high or greater than the predetermined value, the driving control module 316 determines to not perform the autonomous driving during the period between times 408 and 412, for example, to not decrease confidence and to increase user satisfaction. The bottom graph illustrates preventing the autonomous driving (and performing manual driving) between times 408 and 412 and continuously until time 416. Autonomous driving is performed after time 416.

Figure 5:
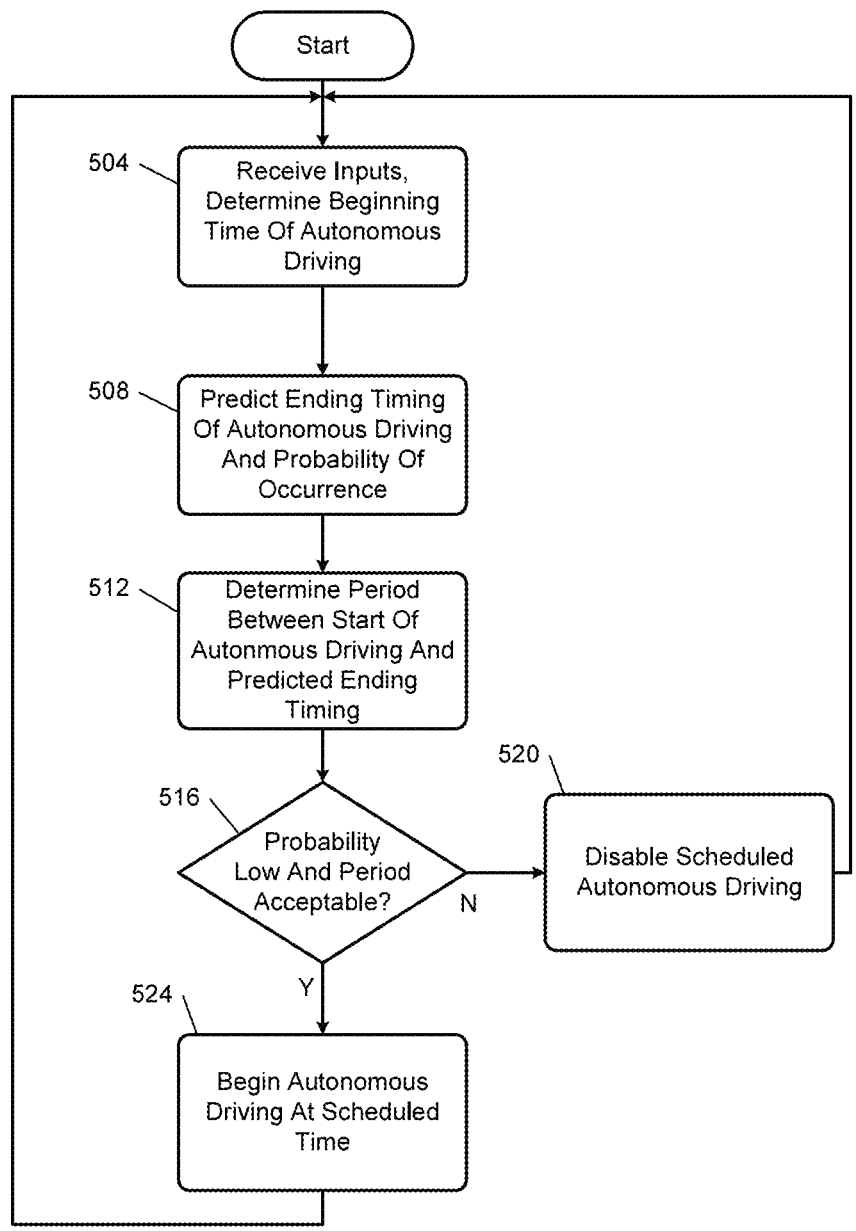
FIGS. 5-7 include flowcharts depicting example methods of controlling autonomous driving.

FIG. 5 is a flowchart depicting an example method of controlling autonomous driving. Control begins with 504 where the driving control module 504 receives inputs, such as the input 320 from the external cameras and sensors 186. The driving control module 316 determines a future time to begin autonomous driving based on the inputs.

At 508, the driving control module 316 determines a predicted time when the autonomous driving will end after the future time when the autonomous driving begins. The driving control module 316 also determines a probability of occurrence of the event that will cause the end of the autonomous driving. The driving control module 316 determines the probability and the predicted time, for example, based on the inputs.

At 512, the driving control module 316 determines a period between the future time to begin autonomous driving and the predicted future time (after the future time) when the autonomous driving will end. At 516, the driving control module 316 determines whether the probability is low or less than a predetermined value and the period is greater than a predetermined period. If 516 is false, the driving control module 316 does not perform the autonomous driving beginning at the future time at 520 and control returns to 504. If 516 is true, the driving control module 316 may prompt the autonomous module 312 to begin autonomous driving at the future time at 524.

Figure 6:
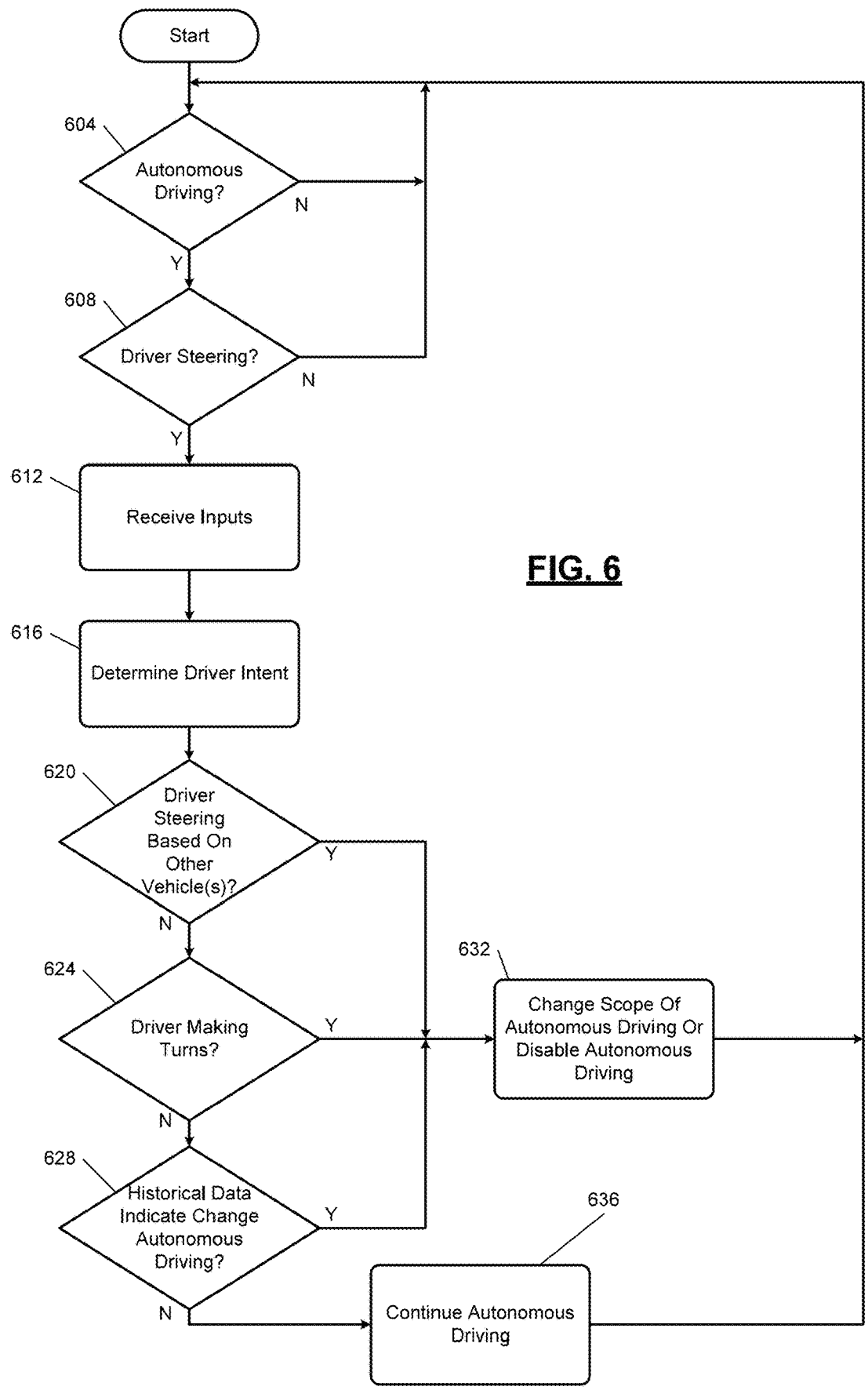

FIG. 6 is a flowchart depicting an example method of controlling autonomous driving. Control begins with 604, where the driving control module 316 determines whether autonomous driving is presently being performed. If 604 is true, control continues with 608. If 604 is false, control returns to 604.

At 608, the driving control module 316 determines whether the driver is steering the vehicle, for example, based on the steering wheel angle 142. If 608 is true, control continues with 612. If 608 is false, control returns to 604. At 612, the driving control module 316 receives additional inputs, such as the APP 166, the BPP 170, the input from the external cameras and sensors 186, the historical data 336, the V2X data 328, and the driver monitoring data 324. At 616, the driving control module 316 determines a driver intent based on the input received.

As an example of determining driver intent at 620, the driving control module 316 may determine whether the driver is changing lane positioning based on driving of other vehicles. For example, a driver may move the vehicle leftward within a lane when another vehicle to the right of the vehicle is driving erratically or moving left to right within its lane. If 620 is true, control transfers to 632 where the driving control module 316 adjusts the scope of the autonomous driving or disables the autonomous driving. Adjusting the scope of the autonomous driving may include, for example, allowing the driver to steer, changing a following distance, changing a target positioning (left to right) of the vehicle within lanes, whether to stop or not when a traffic signal turns yellow, whether to turn right or not on red lights, whether to turn or go straight after a red light, and adjusting one or more other parameters of autonomous driving. If 620 is false, control may continue with 624.

As another example, at 624 the driving control module 316 determines whether the driver is performing turning of the vehicle at intersections. If 624 is true, control transfers to 632 where the driving control module 316 adjusts the scope of the autonomous driving or disables the autonomous driving. Adjusting the scope of driving in this example may be allowing the driver to make turns at intersections and/or one adjusting one or more other parameters of autonomous driving. If 624 is false, control may continue with 628.

As another example, at 628 the driving control module 316 determines whether the historical data 336 indicates that the driver would like to change one or more parameters of autonomous driving. If 628 is true, control transfers to 632 where the driving control module 316 adjusts the scope of the autonomous driving or disables the autonomous driving. Adjusting the scope of driving in this example may be changing a following distance, changing a target positioning (left to right) of the vehicle within lanes, whether to stop or not when a traffic signal turns yellow, whether to turn right or not on red lights, whether to turn or go straight after a red light, and adjusting one or more other parameters of autonomous driving. If 628 is false, the driving control module 316 may continue with the autonomous driving and not adjust the scope of the autonomous driving at 636.

Figure 7:
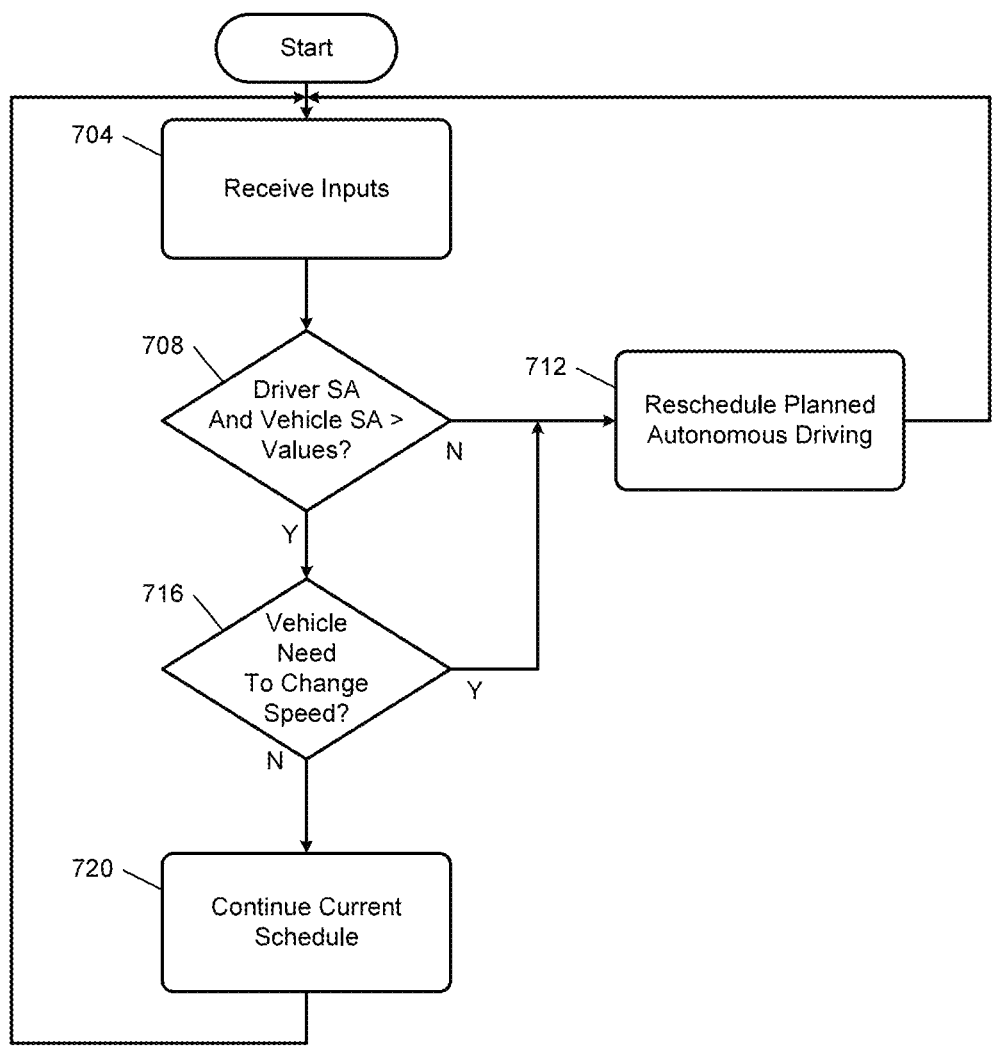

FIG. 7 is a flowchart depicting an example method of controlling autonomous driving. Control begins with 704, where the driving control module 316 receives input, such as the driver monitoring data 324. The driving control module 316 may also receive one or more other inputs, such as the input from the external cameras and sensors 186 and the V2X data 328.

At 708, the driving control module 316 determines one or more situational awareness (SA) values based on the inputs. For example, the driving control module 316 may determine a driver SA value based on the driver monitoring data 324. The driving control module 316 may additionally or alternatively determine a vehicle SA value based on input regarding the external cameras and sensors 186 and/or communication of the V2X module 193. The driver SA value is indicative of the awareness of the driver to the present driving situation. The vehicle SA value is indicative of the awareness of the vehicle to the present driving situation. The SA values may, for example, be a value between 0 and 100 where 100 indicates full awareness of the driving situation and 0 indicates no awareness of the driving situation. The driving control module 316 may decrease the driver SA value, for example, when the driver monitoring data 324 indicates that the driver is not looking outside of the vehicle, when the driver does not have his or her hands on the steering wheel, etc. The driving control module 316 may increase the driver SA value, for example, when the driver monitoring data 324 indicates that the driver is looking outside of the vehicle, when the driver has his or her hands on the steering wheel, etc. The driving control module 316 may determine the driver SA value, for example, using one or more equations that relate the inputs to driver SA values. The driving control module 316 may decrease the vehicle SA value, for example, when a fault is present in one or more of the external cameras and sensors 186, when one or more of the external cameras and sensors 186 are blocked, when one or more of the external cameras and sensors 186 are damaged or improperly calibrated, when signals received by the V2X module 193 are weak (e.g., a signal strength is less than a predetermined value), and/or one or more conditions are present. The driving control module 316 may increase the vehicle SA value, for example, when the external cameras and sensors 186 are functioning properly, when the external cameras and sensors 186 are not blocked, when one or more of the external cameras and sensors 186 are not damaged and properly calibrated, when signals received by the V2X module 193 are strong (e.g., a signal strength is greater than a predetermined value), and/or one or more conditions are present. The driving control module 316 may determine the vehicle SA value, for example, using one or more equations that relate the inputs to vehicle SA values.

At 708, the driving control module 316 determines whether driver and vehicle SA values are greater than predetermined values. If 708 is false, the driving control module 316 may reschedule or disable scheduled autonomous driving in the future at 712. If the driver SA value is less than the predetermined value, the driving control module 316 may also take one or more actions to prompt the driver to increase his or her SA value. If 708 is true, control may continue with 716. The predetermined values may be calibrated and set, for example, to greater than 50 in the example of the SA values being between 0 and 100.

At 716, the driving control module 316 may determine whether the vehicle speed should be changed (increase or decrease), such as based on the input 320 from the external cameras and sensors 186 and/or the V2X data 328. The vehicle speed may be increased or decreased, for example, to avoid another vehicle or object, maintain a predetermined following distance, and/or for one or more other reasons. If 716 is true, control may transfer to 712, as discussed above and reschedule (e.g., delay) or disable scheduled autonomous driving. If 716 is false, the driving control module 316 may continue and enable scheduled autonomous driving at 720.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An autonomous driving system of a vehicle, comprising:
an autonomous module configured to, during autonomous driving, control at least one of:
steering of the vehicle;
braking of the vehicle; and
acceleration and deceleration of the vehicle; and
a driving control module configured to:
enable and disable autonomous driving;
at a present time, determine a future time for beginning a period of autonomous driving; and
selectively delay the beginning time of autonomous driving to after the future time,
wherein the driving control module is further configured to:
determine a situational awareness value for a driver based on input from a driver monitoring system and determine a situational awareness value for the vehicle; and
based on the situational awareness value of the driver and the situational awareness value of the vehicle. selectively delay the beginning time of autonomous driving to after the future time.

2. The autonomous driving system of claim 1 wherein the driving control module is further configured to:
determine a second future time after the future time when an event may occur and end the period of autonomous driving; and
cancel the period of autonomous driving when a period between (a) the future time and (b) the second future time is less than a predetermined period.

3. The autonomous driving system of claim 2 wherein the driving control module is configured to:
determine a probability of the event occurring at the second future time; and
cancel the period of autonomous driving when both:
the period between (a) the future time and (b) the second future time is less than the predetermined period; and
the probability of the event occurring is greater than a predetermined value.

4. The autonomous driving system of claim 3 wherein the driving control module is configured to enable autonomous driving at the future time when at least one of:
the period between (a) the future time and (b) the second future time is greater than the predetermined period; and
the probability of the event occurring is less than the predetermined value.

5. The autonomous driving system of claim 1 wherein the driving control module is configured to selectively adjust one or more of parameters of the autonomous driving based on driver input during autonomous driving.

6. The autonomous driving system of claim 5 wherein the driving control module is configured to adjust a lane positioning during autonomous driving based on driver actuation of a steering wheel during autonomous driving.

7. The autonomous driving system of claim 5 wherein the driving control module is configured to adjust turning at intersections during autonomous driving based on driver turning during autonomous driving.

8. The autonomous driving system of claim 1 wherein the driving control module is configured to, when the situational awareness value of the driver is less than a predetermined value:
selectively delay the beginning of autonomous driving to after the future time.

9. The autonomous driving system of claim 1 wherein the driving control module is further configured to:
determine whether a present speed of the vehicle should be adjusted before beginning the autonomous driving; and
when the present speed should be adjusted, at least one of:
selectively delay the beginning time of autonomous driving to after the future time; and
cancel the period of autonomous driving.

10. The autonomous driving system of claim 1 wherein the driving control module is further configured to selectively advance the beginning timing of autonomous driving to before the future time.

11. The autonomous driving system of claim 10 wherein the driving control module is configured to:
determine a second future time after the future time when an event may occur and end the period of autonomous driving; and
advance the beginning timing of autonomous driving such that a period of autonomous driving between the future time and the second future time is at least a predetermined period.

12. An autonomous driving method for a vehicle, comprising:
during autonomous driving, controlling at least one of:
steering of the vehicle;
braking of the vehicle; and
acceleration and deceleration of the vehicle;
selectively enabling and disabling autonomous driving;
at a present time, determining a future time for beginning a period of autonomous driving;
selectively delaying the beginning time of autonomous driving to after the future time;
determining a situational awareness value for a driver based on input from a driver monitoring system and determining a situational awareness value for the vehicle; and
wherein the selectively delaying the beginning time includes, based on the situational awareness value of the driver and the situational awareness value of the vehicle, selectively delaying the beginning time of autonomous driving to after the future time.

13. The autonomous driving method of claim 12 further comprising:
determining a second future time after the future time when an event may occur and end the period of autonomous driving; and
cancelling the period of autonomous driving when a period between (a) the future time and (b) the second future time is less than a predetermined period.

14. The autonomous driving method of claim 13 further comprising:

determining a probability of the event occurring at the second future time; and cancelling the period of autonomous driving when both:
the period between (a) the future time and (b) the second future time is less than the predetermined period; and
the probability of the event occurring is greater than a predetermined value.

15. The autonomous driving method of claim 14 further comprising enabling autonomous driving at the future time when at least one of:
the period between (a) the future time and (b) the second future time is greater than the predetermined period; and
the probability of the event occurring is less than the predetermined value.

16. The autonomous driving method of claim 12 further comprising selectively adjusting one or more of parameters of the autonomous driving based on driver input during autonomous driving.

17. The autonomous driving method of claim 16 further comprising adjusting a lane positioning during autonomous driving based on driver actuation of a steering wheel during autonomous driving.

18. The autonomous driving method of claim 16 further comprising adjusting turning at intersections during autonomous driving based on driver turning during autonomous driving.

19. The autonomous driving method of claim 12 further comprising selectively advancing the beginning timing of autonomous driving to before the future time.

* * * * *